US009466184B2

(12) United States Patent
Bond et al.

(10) Patent No.: US 9,466,184 B2
(45) Date of Patent: *Oct. 11, 2016

(54) GAMING SYSTEM AND A METHOD OF GAMING FOR PROVIDING A SPINNER GAME

(71) Applicant: Aristocrat Technologies Australia Pty Limited, North Ryde (AU)

(72) Inventors: Anthony Wayne Bond, Las Vegas, NV (US); Stephen C. Jones, Henderson, NV (US); Philip Jeffrey Anderson, Las Vegas, NV (US); Scott Monroe Stewart, Las Vegas, NV (US); Gary Frerking, Henderson, NV (US)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,936

(22) Filed: Jun. 19, 2015

(65) Prior Publication Data

US 2015/0287288 A1 Oct. 8, 2015

Related U.S. Application Data

(63) Continuation of application No. 13/954,413, filed on Jul. 30, 2013, now abandoned, which is a continuation of application No. 12/631,270, filed on Dec. 4, 2009, now Pat. No. 8,517,815.

(60) Provisional application No. 61/120,244, filed on Dec. 5, 2008.

(51) Int. Cl.

| | |
|---|---|
| *A63F 13/00* | (2014.01) |
| *G07F 17/34* | (2006.01) |
| *G07F 17/32* | (2006.01) |

(52) U.S. Cl.
CPC ............ *G07F 17/34* (2013.01); *G07F 17/326* (2013.01); *G07F 17/3213* (2013.01); *G07F 17/3244* (2013.01)

(58) Field of Classification Search
None
See application file for complete search history.

(56) References Cited

U.S. PATENT DOCUMENTS

| | | | |
|---|---|---|---|
| 5,106,091 | A | 4/1992 | Comito |
| 6,988,731 | B2 | 1/2006 | Inoue |

(Continued)

OTHER PUBLICATIONS

United States Patent and Trademark Office, "Non-Final Office Action," issued in connection with U.S. Appl. No. 12/631,270, on Dec. 23, 2011 (13 pages).

(Continued)

*Primary Examiner* — Jason Yen
(74) *Attorney, Agent, or Firm* — Armstrong Teasdale LLP

(57) ABSTRACT

A gaming system is disclosed which includes a plurality of spinners, each spinner being associated with a plurality of display positions and having a plurality of symbols disposable at the display positions. A spinner controller is arranged to select the symbols to appear at the display positions for each spinner, and an outcome evaluator is arranged to determine whether the symbols shown at the display positions correspond to at least one winning outcome by reference to at least one defined win condition. Each win condition comprises a win line having at least three display positions from two adjacent spinners. A corresponding method of gaming is also disclosed.

36 Claims, 8 Drawing Sheets

(56) References Cited

U.S. PATENT DOCUMENTS

| | | | |
|---|---|---|---|
| 8,388,436 | B2 | 3/2013 | Rodgers et al. |
| 2003/0178768 | A1 * | 9/2003 | Luciano .................... A63F 5/00 273/142 HA |
| 2004/0259627 | A1 | 12/2004 | Walker et al. |
| 2005/0119039 | A1 * | 6/2005 | Berman .............. G07F 17/3286 463/16 |
| 2006/0183532 | A1 * | 8/2006 | Jackson .............. G07F 17/3262 463/20 |
| 2007/0087806 | A1 | 4/2007 | Luciano et al. |
| 2009/0227357 | A1 | 9/2009 | Rasmussen |
| 2013/0316780 | A1 | 11/2013 | Bond et al. |

OTHER PUBLICATIONS

United States Patent and Trademark Office, "Notice of Allowance," issued in connection with U.S. Appl. No. 12/631,270, on May 20, 2013 (16 pages).

United States Patent and Trademark Office, "Non-Final Office action," issued in connection with U.S. Appl. No. 13/954,413, on Nov. 5, 2013 (18 pages).

United States Patent and Trademark Office, "Final Office action," issued in connection with U.S. Appl. No. 13/954,413, on Jun. 5, 2014 (13 pages).

United States Patent and Trademark Office, "Non-Final Office action," issued in connection with U.S. Appl. No. 13/954,413, on Dec. 22, 2014 (15 pages).

* cited by examiner

GAMING SYSTEM AND A METHOD OF GAMING FOR PROVIDING A SPINNER GAME

CROSS-REFERENCE TO RELATED APPLICATIONS

This application is a continuation of and claims priority to U.S. patent application Ser. No. 13/954,413, filed on Jul. 30, 2013, entitled "A GAMING SYSTEM AND A METHOD OF GAMING", which claims the benefit of priority from U.S. patent application Ser. No. 12/631,270, filed on Dec. 4, 2009, entitled "A GAMING SYSTEM AND A METHOD OF GAMING", which claims the benefit of priority to U.S. Provisional Patent Application No. 61/120,244, filed on Dec. 5, 2008, entitled "A GAMING SYSTEM AND A METHOD OF GAMING", each of which is hereby incorporated by reference in its entirety for all purposes.

FIELD OF THE INVENTION

The present invention relates to a gaming system and to a method of gaming.

BACKGROUND

It is known to provide a gaming system which includes a game controller arranged to randomly display several symbols from a predetermined set of symbols and to determine a game outcome such as a game win based on the displayed symbols. In some arrangements, a win outcome is defined on the basis of occurrence of symbols along defined win lines which may be preselected or selected by a player prior to display of symbols by the gaming system.

Such gaming systems may commonly be implemented as a stepper machine provided with reels with each reel carrying several symbols of the set, or a video machine wherein selected symbols are displayed on virtual reels on a graphical display device.

However, while such gaming systems provide users with enjoyment, a need exists for alternative gaming systems in order to maintain or increase player enjoyment.

SUMMARY

In accordance with a first aspect of the present invention, there is provided a gaming system including:

a plurality of spinners, each spinner being associated with a plurality of display positions and having a plurality of symbols disposable at the display positions;

a spinner controller arranged to select the symbols to appear at the display positions for each spinner; and an outcome evaluator arranged to determine whether the symbols shown at the display positions correspond to at least one winning outcome by reference to at least one defined win condition, each win condition including a win line having at least three display positions from two adjacent spinners.

In one embodiment, the gaming system further includes a prize allocator arranged to allocate a prize to a player when a winning outcome exists.

In one embodiment, each spinner has a respective set of associated symbols, which may be disposed on the spinner in a defined configuration, or selectable for disposal on the spinner.

In an embodiment wherein each spinner has a respective set of associated symbols and symbols are selectable for disposal on a spinner, the number of symbols in the set may be equal to or greater than the number of display positions associated with the spinner.

In an alternative embodiment, a common pool of symbols is provided from which symbols are selectable for a plurality of spinners.

In one arrangement, all symbols associated with the spinners are visible to a player.

In one embodiment, at least one win line is defined for each 2 adjacently disposed spinners.

In one embodiment, each win line includes 3 or 4 display positions.

In one embodiment, at least one of the win lines is linear.

In another embodiment, at least one win line is non-linear.

In one embodiment, the symbols associated with a spinner are disposed around a periphery of the spinner.

In one arrangement, the spinners are substantially circular.

A winning outcome may be defined in relation to symbols appearing in one or more win lines.

In one embodiment, 3 or 4 spinners are provided, which may be respectively disposed in a triangular or diamond shaped configuration.

In one embodiment, the spinners are virtual spinners represented on a display.

In an alternative embodiment, the spinners are physical spinners.

The gaming system may be arranged to operate in normal game mode wherein at least one base game is implemented and special game mode wherein the gaming system operates in accordance with the first aspect of the present invention.

The gaming system may be arranged to commence a feature or special game mode when a specific game outcome occurs.

In addition or alternatively, the gaming system may be arranged to commence special game mode on the basis of a game event occurring during a game such as display of a particular symbol, in response to player input, based on the amount or type of bet placed, or when a feature or special game is purchased by a player.

The gaming system may be implemented as a stand alone gaming machine or across a network.

In one embodiment, one or more of the spinner controller, the prize allocator and the outcome evaluator is constituted, at least in part, by a processor executing program code stored in a memory.

In one embodiment, the gaming system includes a game play mechanism operable to place a wager and the outcome evaluator evaluates the outcome based on the wager.

In accordance with a second aspect of the present invention, there is provided a method of gaming including:

providing a plurality of spinners, each spinner being associated with a plurality of display positions and having a plurality of symbols disposable at the display positions;

selecting the symbols to appear at the display positions for each spinner;

determining whether the symbols shown at the display positions correspond to at least one winning outcome by reference to at least one defined win condition, each win condition including a win line having at least three display positions from two adjacent spinners; and allocating a prize to a player when a winning outcome exists.

In accordance with a third aspect of the present invention, there is provided a computer program arranged when loaded into a computer to instruct the computer to operate in accordance with a gaming system including:

a plurality of spinners, each spinner being associated with a plurality of display positions and having a plurality of symbols disposable at the display positions;

a spinner controller arranged to select the symbols to appear at the display positions for each spinner;

an outcome evaluator arranged to determine whether the symbols shown at the display positions correspond to at least one winning outcome by reference to at least one defined win condition, each win condition including a win line having at least three display positions from two adjacent spinners; and a prize allocator arranged to allocate a prize to a player when a winning outcome exists.

In accordance with a fourth aspect of the present invention, there is provided a computer readable medium having computer readable program code embodied therein for causing a computer to operate in accordance with a gaming system including:

a plurality of spinners, each spinner being associated with a plurality of display positions and having a plurality of symbols disposable at the display positions;

a spinner controller arranged to select the symbols to appear at the display positions for each spinner;

an outcome evaluator arranged to determine whether the symbols shown at the display positions correspond to at least one winning outcome by reference to at least one defined win condition, each win condition including a win line having at least three display positions from two adjacent spinners; and a prize allocator arranged to allocate a prize to a player when a winning outcome exists.

In accordance with a fifth aspect of the present invention, there is provided a data signal having computer readable program code embodied therein for causing a computer to operate in accordance with a gaming system including:

a plurality of spinners, each spinner being associated with a plurality of display positions and having a plurality of symbols disposable at the display positions;

a spinner controller arranged to select the symbols to appear at the display positions for each spinner;

an outcome evaluator arranged to determine whether the symbols shown at the display positions correspond to at least one winning outcome by reference to at least one defined win condition, each win condition including a win line having at least three display positions from two adjacent spinners; and a prize allocator arranged to allocate a prize to a player when a winning outcome exists.

BRIEF DESCRIPTION OF THE DRAWINGS

Certain embodiments of the present invention will now be described, by way of example only, with reference to the accompanying drawings, in which.

Figure 1:
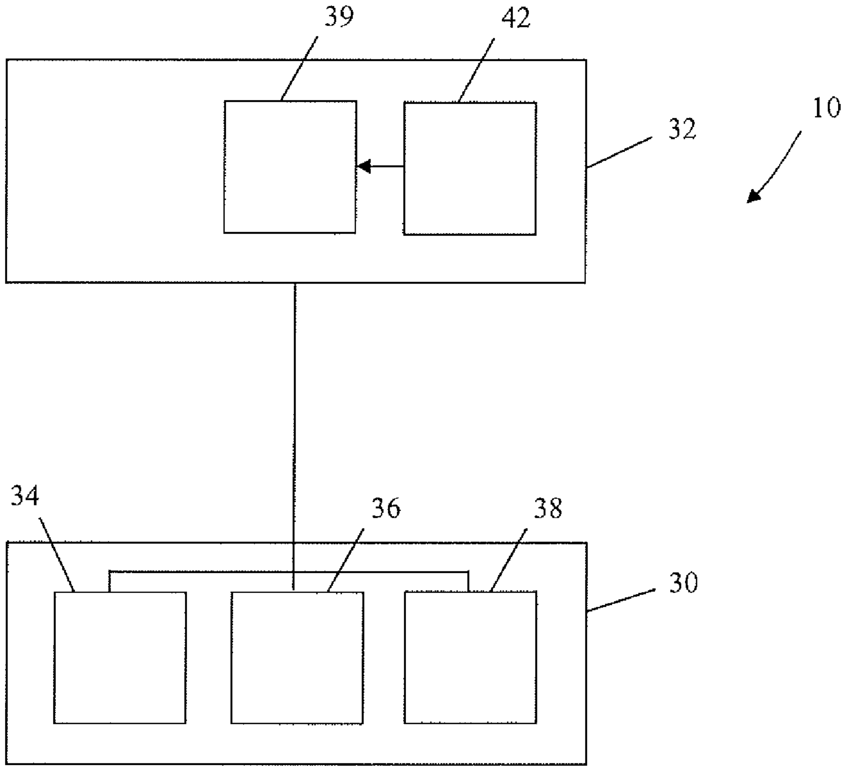
FIG. 1 is a schematic block diagram of core components of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DESCRIPTION OF CERTAIN EMBODIMENTS

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, etc. storing the software and/or firmware.

The present gaming system operates such that at least during a portion of a game implemented by the gaming system, the gaming system is arranged to display a plurality of spinners, each of which includes a plurality of symbols disposable in a respective plurality of display positions, and to spin and subsequently stop the spinners. Winning outcomes are determined by reference to at least one win condition, with each win condition including a win line having at least 3 display positions from an adjacent 2 spinners.

The win lines may each include 3 or more display positions from 2 or more spinners, with winning outcomes and the awarded prizes being determined on the basis of the symbols disposed along the defined win lines after the spinners have stopped rotating.

In one embodiment, the gaming system is arranged to implement a base game, for example of the type including a plurality of symbol bearing reels, and a feature or special game which is triggered during a base game and which includes a plurality of symbol bearing spinners, although it will be understood that the gaming system may as an alternative be arranged so as to implement a game with spinners only.

In the following embodiment, the gaming system is arranged to implement a base game and a feature game.

Referring to the drawings, there is shown a schematic block diagram of a gaming system 10 arranged to implement a probabilistic game of the type wherein during normal game mode several symbols from a set of symbols are randomly displayed in a plurality of reels, and a game outcome is determined on the basis of the displayed symbols.

With some such probabilistic games, the set of symbols used during normal game mode include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

Referring to FIG. 1, a schematic diagram of core components of a gaming system 10 in accordance with the present embodiment is shown. The core components include a player interface 30 and a game controller 32. The player interface 30 is arranged to enable interaction between a player and the gaming system and for this purpose includes input/output components for the player to enter instructions and play the game.

Components of the player interface 30 may vary but will typically include a credit mechanism 34 to enable a player to input credits and receive payouts, one or more displays 36 which may include a touch screen, and a game play mechanism 38 arranged to enable a player to input game play instructions.

The game controller 32 is in data communication with the player interface 30 and typically includes a processor 39 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
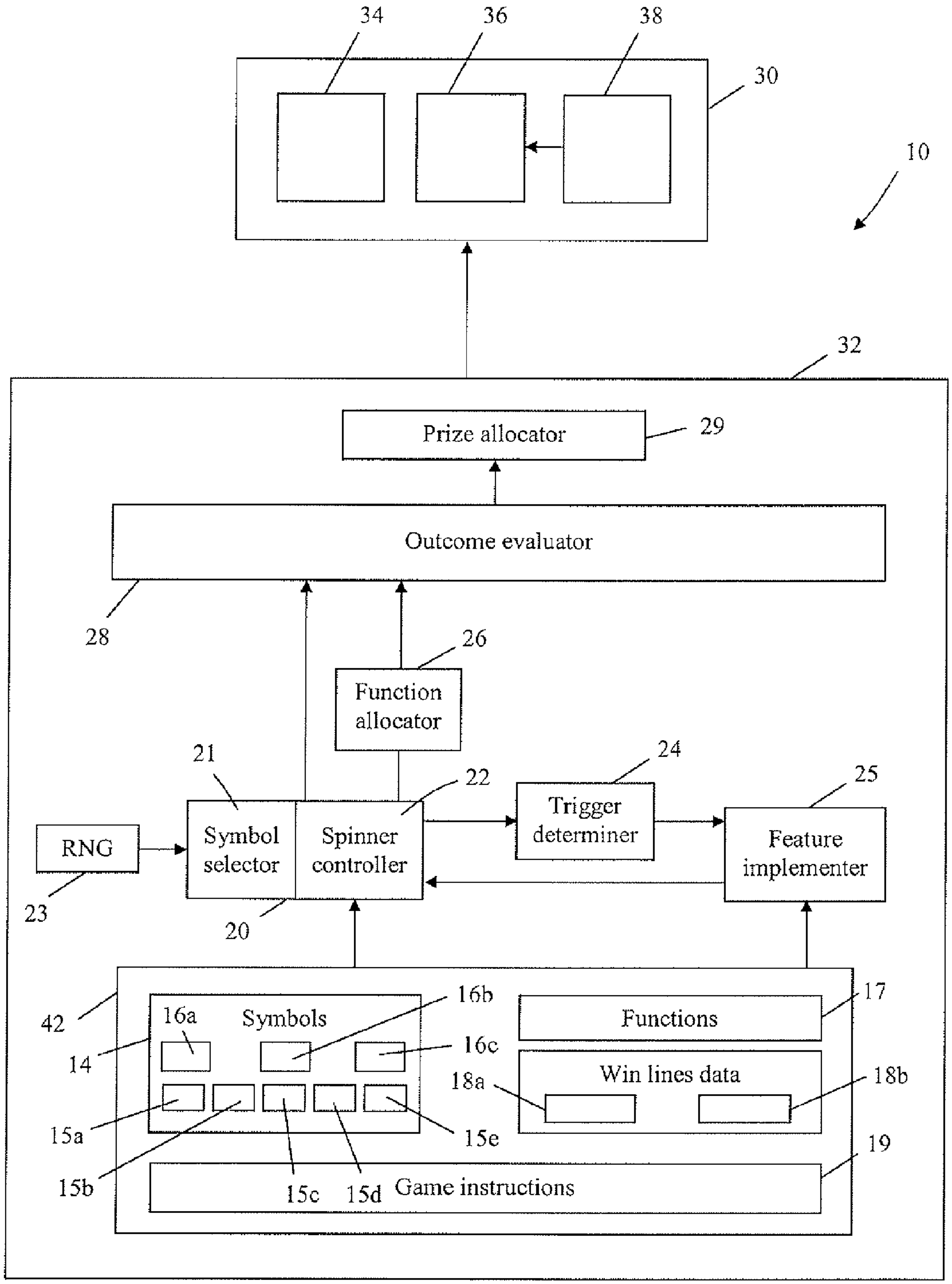
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of a plurality of symbols. In the present example, since the gaming system is arranged to implement both a base game wherein a plurality of symbol bearing reels are provided and a feature game wherein a plurality of symbol bearing spinners are provided, the symbols 14 include base game symbols 15 associated with a plurality of reels, and feature game symbols 16 associated with a plurality of spinners. In this embodiment, each reel has a defined set of reel symbols 15*a*, 15*b*, 15*c*, 15*d*, 15*e* and each spinner had a defined set of spinner symbols 16*a*, 16*b*, 16*c*, although it will be understood that other variations are possible.

The memory 42 is also arranged to store base win lines data 18*a* indicative of win lines available during a base game and feature win lines data 18*b* indicative of win lines available during a feature game, function data 17 indicative of one or more functions allocatable to the symbols during a base game and/or a feature game, and game instruction data 19 indicative of game instructions usable by the gaming machine 10 to control operation of the game.

The game controller 32 also includes a selector 20 in this example having a symbol selector 21 and a spinner controller 22.

During normal game mode wherein a base game is implemented, the symbol selector 21 is arranged to select several symbols from the available symbols 15 for display to a player in a plurality of display positions. A plurality of symbol bearing reels are then spun and subsequently stopped so as to display at least one symbol on each reel.

During a feature or special game mode, the spinner controller 22 is arranged to control a plurality of spinners so as to determine the relative display positions of the symbols on the spinners. This is represented on the display by spinning and subsequently stopping the spinners. In this example, during special game mode, each spinner has a defined set of symbols and the relative positions of the symbols after the spinners have stopped rotating determines whether a winning outcome exists with reference to one or more defined win conditions. In this example, the selection carried out by the symbol selector 21 and the stopping positions of the spinners determined by the spinner controller 22 are made using a random number generator 23.

It will be appreciated that the random number generator 23 may be of a type which is arranged to generate pseudo random numbers based on a seed number, and that in this specification the term "random" will be understood accordingly to mean truly random or pseudo random.

With this embodiment, the game controller 32 also includes a trigger determiner 24 arranged to determine whether a trigger condition exists and to instruct a feature implementer 25 to implement a feature or special game mode when a trigger condition has been detected. Such a trigger condition may be display of a particular symbol or combination of symbols, or any other game related event.

In this example, the game controller 32 also includes a function allocator 26 arranged to select and allocate one or more functions to one or more symbols. Such functions include a wild function, a scatter function, or any other function which may be applied to a symbol or to the game.

The game controller 32 also includes an outcome evaluator 28 which in accordance with the game instructions 18 determines game outcomes based on the symbols selected for display to the player by the symbol selector 21 and the relative positions of the symbols on the reels during a base game, and on the symbols and relative positions of the symbols on the spinners during a feature game.

The game controller 32 also includes a prize allocator 29 arranged to allocate a prize to a player when a winning outcome exists, the type of prize being dependent on the particular winning outcome.

In the embodiments described below, the symbol selector 21, the trigger determiner 24, the feature implementer 25, the function allocator 26, the outcome evaluator 28, and the prize allocator 29 are at least partly implemented using the processor 39 and associated software, although it will be understood that other implementations are envisaged.

The gaming system 10 can take a number of different forms.

In a first form, a stand alone gaming machine is provided wherein all or most components to implement the game are present in a player operable gaming machine.

In a second form, a distributed architecture is provided wherein some of the components to implement the game are present in a player operable gaming machine and some of the components to implement the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Figure 3:
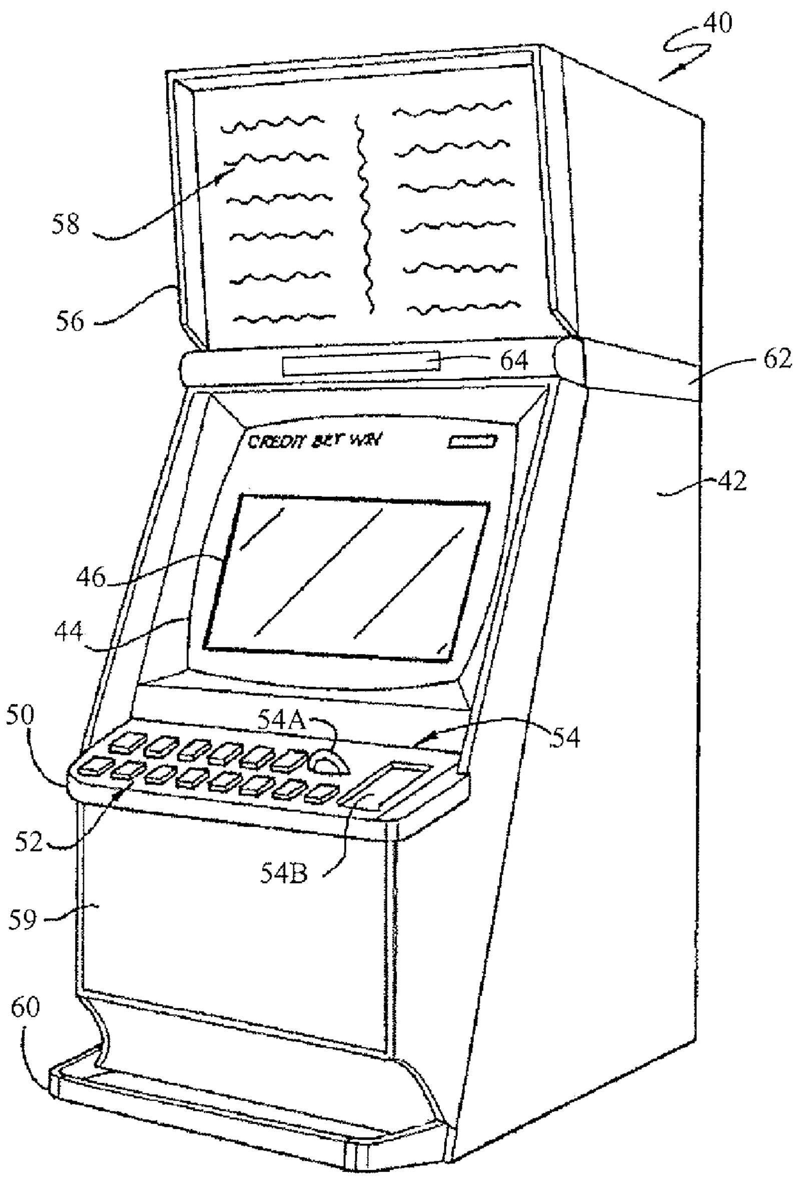
FIG. 3 is a diagrammatic representation of a gaming system in accordance with an embodiment of the present invention with the gaming system implemented in the form of a stand alone gaming machine.

A gaming system in the form of a stand alone gaming machine 40 is illustrated in FIG. 3. The gaming machine 40 includes a console 42 having a display 44 on which is displayed representations of a game 46 that can be played by a player. A mid-trim 50 of the gaming machine 40 houses a bank of buttons 52 for enabling a player to interact with the gaming machine, in particular during game play. The mid-trim 50 also houses a credit input mechanism 54 which in this example includes a coin input chute 54A and a bill collector 54B. Other credit input mechanisms may also be employed, for example, a card reader for reading a smart card, debit card or credit card.

A top box 56 may carry artwork 58, including for example pay tables and details of bonus awards and other information or images relating to the game. Further artwork and/or information may be provided on a front panel 59 of the console 42. A coin tray 60 is mounted beneath the front panel 59 for dispensing cash payouts from the gaming machine 40.

The display 44 is in the form of a video display unit, particularly a cathode ray tube screen device. Alternatively, the display 44 may be a liquid crystal display, plasma screen, or any other suitable video display unit. The top box 56 may also include a display, for example a video display unit, which may be of the same type as the display 44, or of a different type. The display 44 may include a touch screen usable by a player to interact with the gaming machine, in particular during game play.

The display 44 in this example is arranged during normal game mode to display representations of several reels, each reel of which has several associated symbols. Typically 3, 4 or 5 reels are provided. During operation of a base game, the reels first appear to rotate then stop with typically three symbols visible on each reel. Base game outcomes are determined on the basis of the visible symbols together with any special functions associated with the symbols.

In this embodiment, the display 44 is also arranged during a feature of special game mode to display representations of several spinners, each of which has several associated symbols. Typically 3, 4 or 5 spinners are provided. During operation of the game, the spinners first appear to rotate then stop with typically all symbols visible on each spinner. Game outcomes are determined on the basis of the displayed symbols together with any special functions associated with the symbols, and with reference to defined win lines which span two or more spinners and include at least 3 symbol positions.

In an alternative embodiment, the feature game may be shown on a different display, for example on a video display provided on the top box 56.

A player marketing module (PMM) 62 having a display 64 is connected to the gaming machine 10. The main purpose of the PMM 62 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel® III device produced by Aristocrat Technologies Pty Ltd.

Figure 4:
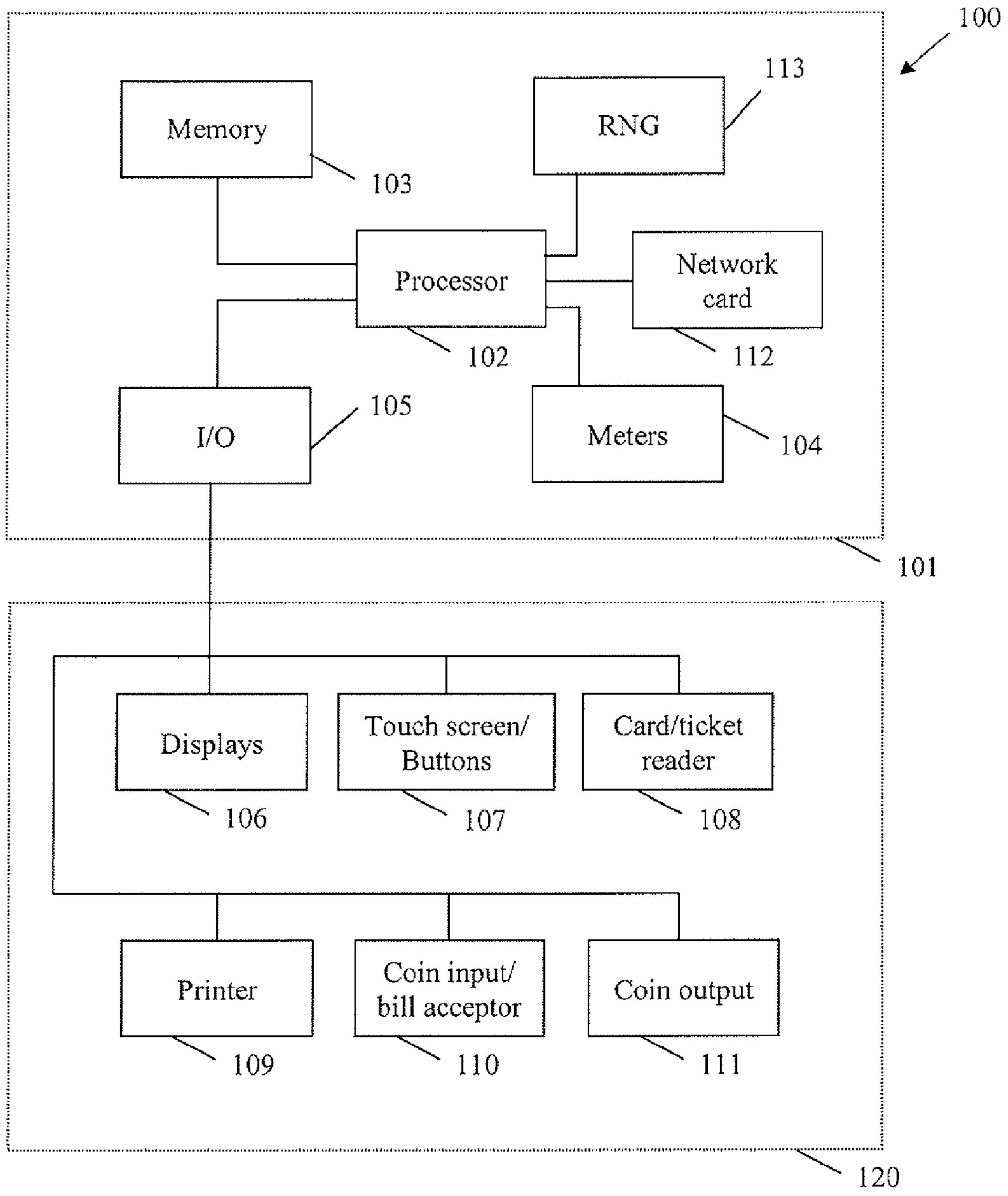
FIG. 4 is a schematic block diagram of operative components of the gaming machine shown in FIG. 3.

FIG. 4 shows a block diagram of operative components of a gaming machine 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
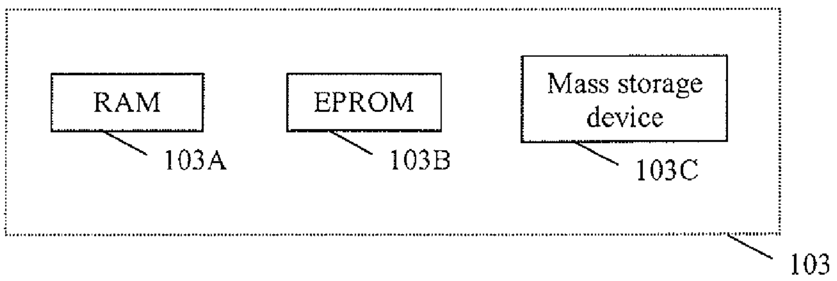
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 include one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

Figure 6:
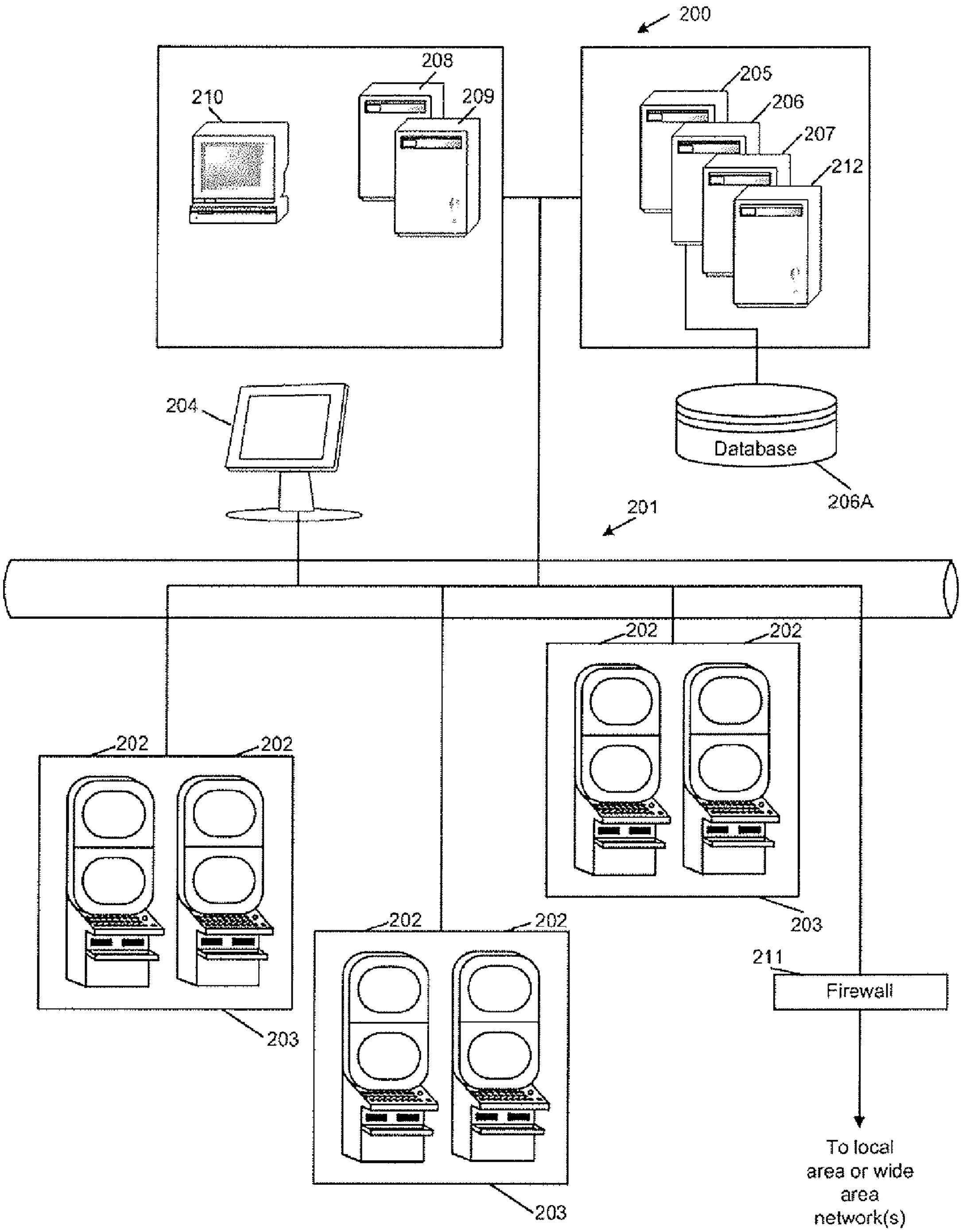
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the rules, requirements, preferences, and/or guidelines for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Examples of specific implementations of the gaming system will now be described in relation to a stand alone gaming machine 10, 40, 100 although it will be understood that implementation may also be carried out using other gaming system architectures such as a network architecture of the type shown in FIG. 6.

In this example, the gaming system is operable in normal game mode and special game mode.

During normal game mode, the gaming system uses five reels, each of which has an associated set of symbols.

The reels include standard symbols and optionally one or more function symbols and win outcomes are determined on the basis of the symbols visible at the display positions when the reels stop rotating.

Typically, a player will purchase or otherwise obtain win entitlements such as several win lines which are used in the game to determine win outcomes. If the displayed symbols on the reels have symbols associated with a winning combination such as disposed on a win line, the player wins a prize.

The gaming system may be arranged to commence special game mode when a predetermined game outcome occurs, and special game mode may include one or more free games. Special game mode may commence automatically on the basis of a game event occurring during a base game such as display of a particular symbol, based on game outcomes determined by the gaming system, or may be prompted by a player pressing a button on the gaming system 10, 40, 100 after the player has identified that a game outcome corresponding to special game mode requirements has occurred.

The gaming system 10, 40, 100 may also be arranged so as to determine eligibility for special game mode, for example based on the amount or type of bet placed, based on certain time periods and so on.

A feature or special game mode may also be arranged to commence when a special game is purchased by a player.

Figure 7:
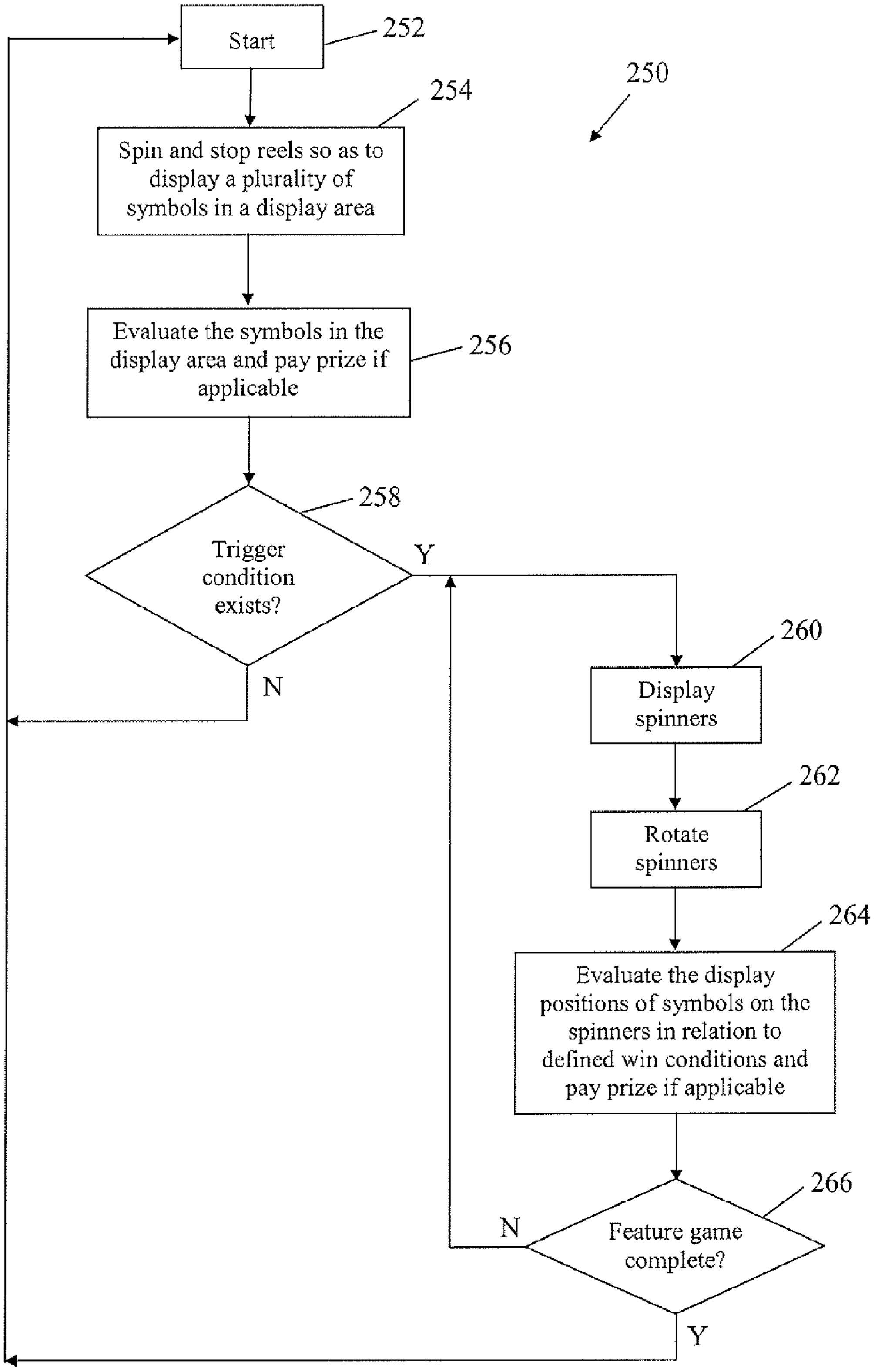
FIG. 7 is a flow diagram illustrating game play of a gaming system in accordance with an embodiment of the present invention; and FIGS. *8a* and *8b* are diagrammatic representations of an example screen displayed by a gaming system in accordance with an embodiment of the present invention during implementation of a game and wherein 3 spinners are provided.

A specific example will now be described in relation to flow diagram 250 shown in FIG. 7 which illustrates steps 252 to 266 of a method of gaming implemented by the gaming system according to the present embodiment.

In this example, during normal game mode five virtual or stepper reels are provided and, as such, representations of the reels are displayed on a graphical display device 44.

The reels are spun 254 and subsequently stopped to display a symbol at each display position in a display area, and the outcome generator 28 determines at 256 whether the symbols displayed at the display positions correspond to a winning outcome. If a trigger condition exists at 258 (for example a special symbol or combination of symbols appearing at the display device 44), the feature or special game mode commences.

Commencement of special game mode causes a feature game to be implemented wherein a plurality of spinners are used instead of reels.

Figure 8A:
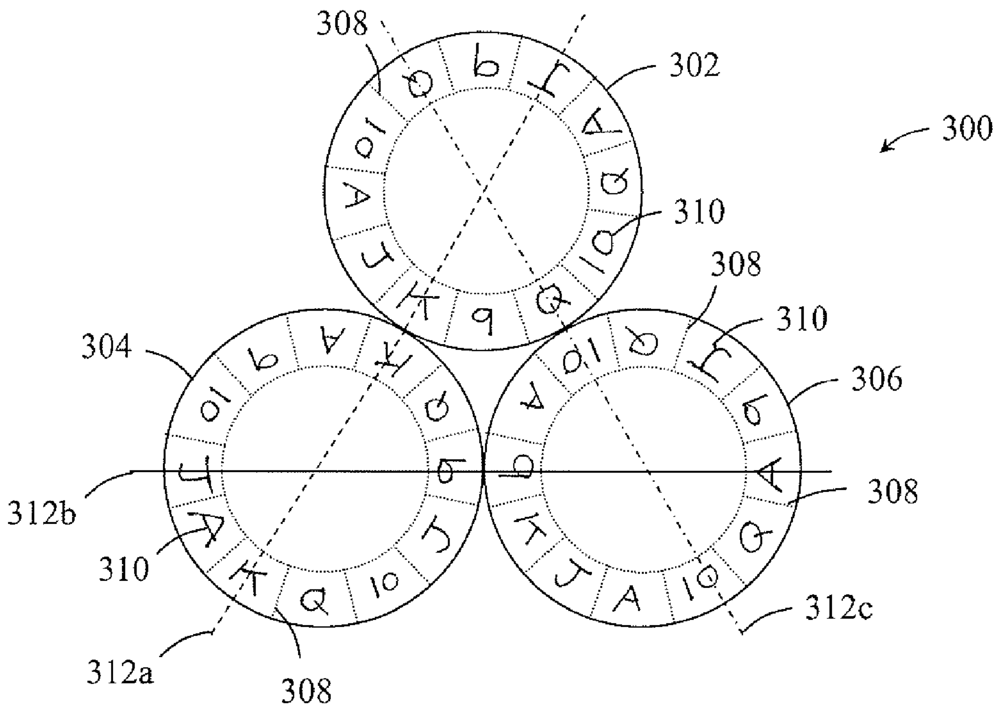

In FIG. 8, an example representation 300 is shown of 3 spinners 302, 304, 306 which are disposed relative to each other so as to define a generally triangular configuration. Each spinner has a plurality of associated display positions 308 and a plurality of symbols 310, and each symbol 310 is disposable in any one of the display positions 308 by spinning and subsequently stopping the spinner 302, 304, 306.

Figure 8B:
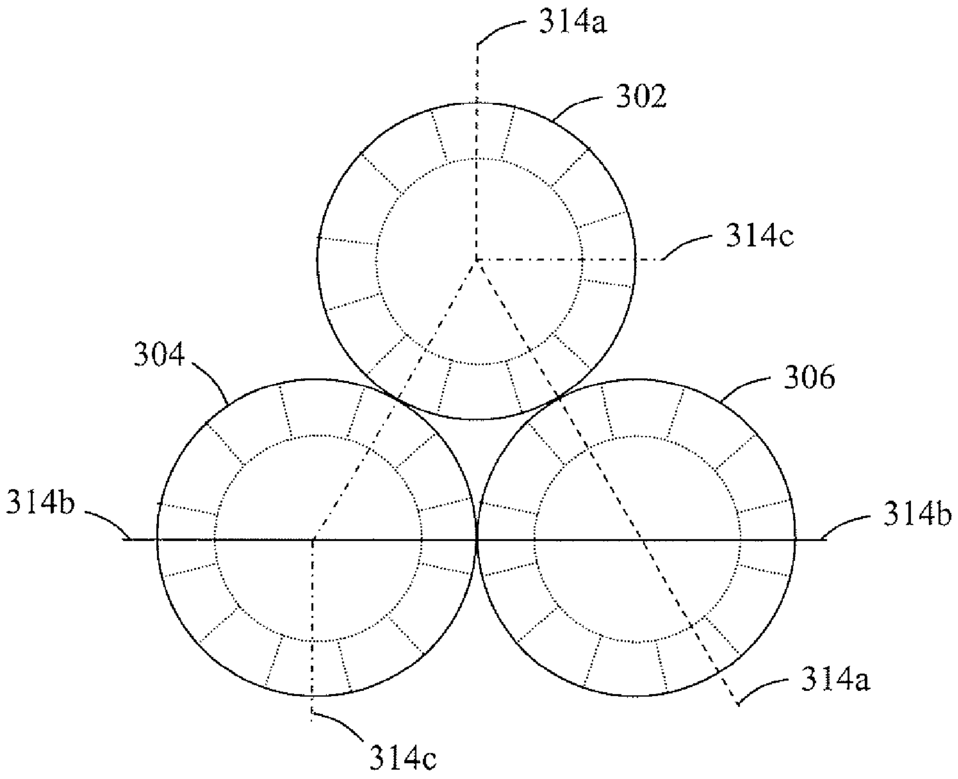

The gaming system is configured such that a plurality of win lines 312*a-c* are defined between adjacent spinners, with each win line including at least 3 display positions and spanning at least two spinners. In the present example shown in FIG. 8*a,* 3 win lines are defined, each of which passes through the centers of rotation of an adjacent 2 spinners and each of which includes 4 display positions. However, it will be understood that any other win lines may alternatively or additionally be defined, including non-linear win lines, for example alternative win lines 314 as shown in FIG. 8*b*.

In the present example, 3 King symbols are present on a first win line 312*a* which equates to a winning outcome. It will be understood that winning outcomes may be based on any defined combination of symbols appearing along a win line or appearing on multiple win lines. For example, a winning outcome may be defined based on occurrence of a defined combination of symbols starting from a particular end of a win line, appearing anywhere on a win line, or as a scatter combination wherein at least 3 symbols appear on two or more win lines.

Figure 9:
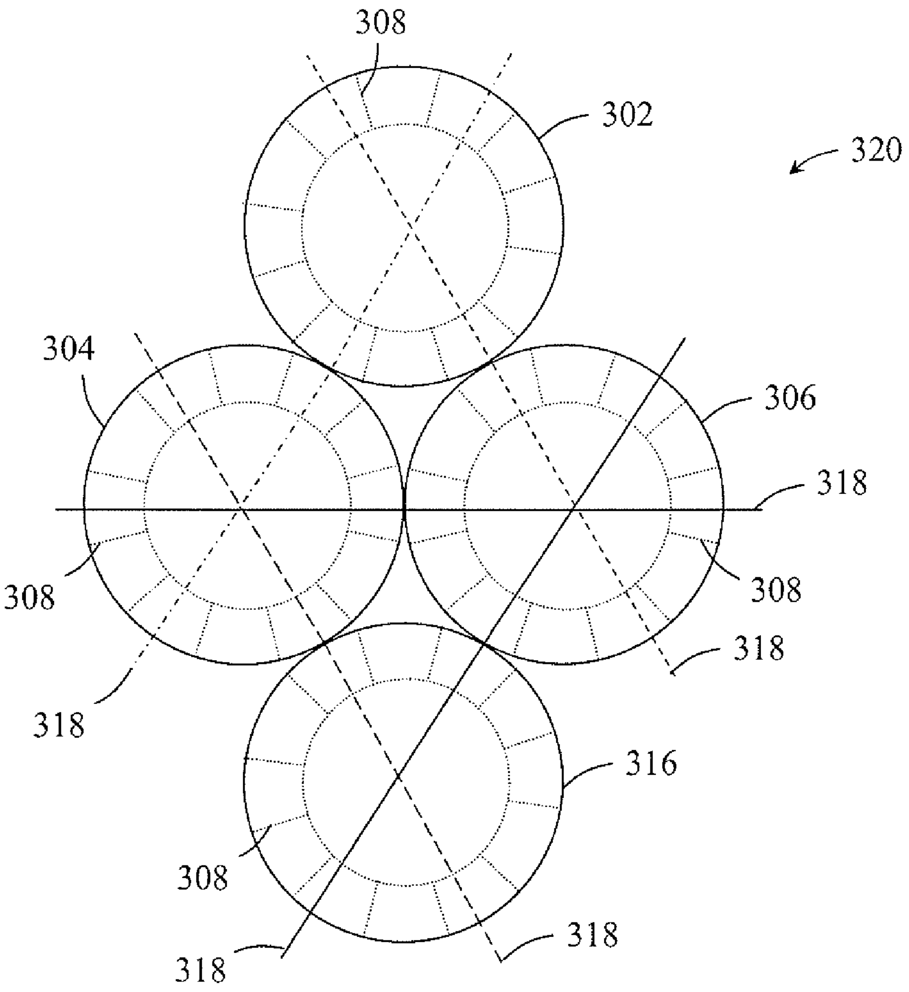
FIG. 9 is a diagrammatic representation of an alternative example screen displayed by a gaming system in accordance with an embodiment of the present invention during implementation of a game and wherein 4 spinners are provided.

In FIG. 9, an alternative example representation 320 is shown of 4 spinners 302, 304, 306, 316 which are disposed relative to each other so as to define a generally diamond shaped configuration. As with the embodiments shown in FIG. 8, each spinner has a plurality of associated display positions 308 and a plurality of symbols 310, and each symbol is disposable in any one of the display positions by spinning and subsequently stopping the spinner. With this embodiment, 5 win lines 318 are defined between adjacent spinners, with each win line including at least 3 display positions and each win line passing through the centers of rotation of an adjacent 2 spinners.

Returning to FIG. 7, if a trigger condition exists at 258, at 260 the spinners (302, 304, 306 in FIG. 8*a*, for example) are displayed at the display 44 or at an additional display such as a display in the top box 56 and at 262 they are rotated to an eventual stop position. At 264 the symbols 310 displayed on determined win lines 312*a-c* are evaluated and if a win occurs the corresponding prize is proved to the player. The feature game may include other aspects such as, for example, multiple spins of one, several or all of the spinners 302, 304, 306. At 266 (FIG. 7), the processor determines that the feature game is completed and returns the game to the start of a new game.

It will be understood that any plural number of spinners may be provided in accordance with the invention, the important aspect being that the spinners are used to define win lines having 3 or more display positions.

It will also be understood that while in the present embodiment each spinner has a fixed set of associated symbols, it will be understood that other variations are possible. For example, the symbols associated with a spinner may change and/or may be selectable for all spinners from a pool of common symbols.

It will also be understood that a prize awarded to a player may be a monetary prize, may be in the form of a number of free games which may be feature games, or may be in any other suitable form.

While the above embodiments are described in relation to a gaming system which includes a display on which a plurality of spinners are represented, it will be understood that other variations are possible. For example, physical spinners may be provided.

Modifications and variations as would be apparent to a skilled addressee are deemed to be within the scope of the present invention.

One or more of the components of the systems and/or blocks of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method blocks and/or perform the blocks in a different order than the order listed. For example, some blocks may not be performed in certain embodiments of the present invention. As a further example, certain blocks may be performed in a different temporal order, including simultaneously, than listed above.

Certain examples include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Examples can be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Examples can also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A gaming system comprising:
- a credit mechanism configured to receive a wager from a player for play of a base game, wherein the credit mechanism includes at least one of a coin acceptor, a bill acceptor, a card reader, and a ticket reader;
- a display configured to present the base game to the player;
- a plurality of non-concentric spinners, each spinner of the plurality of non-concentric spinners comprising a plurality of display positions annularly disposed on the spinner, and having a plurality of symbols displayable at the plurality of display positions, wherein all display positions of the plurality of display positions are visible to a player during play of the gaming system; and
- a game controller comprising:
  - a base game controller configured to conduct the base game, wherein a spinner game initiates upon an occurrence of a trigger condition in the base game;
  - a spinner controller configured to select the symbols to appear at the display positions for each spinner during the spinner game; and
  - an outcome evaluator configured to:
    - determine whether the symbols shown at the display positions correspond to at least one winning outcome by reference to at least one predefined combination of symbols, each predefined combination of symbols comprising a win line extending through respective centers of rotation of two adjacent spinners of the plurality of non-concentric spinners, the win line including two display positions from each of the two adjacent spinners; and
    - determine a payout for the spinner game.

2. A gaming system as claimed in claim 1, further comprising a prize allocator configured to allocate a prize to a player when a winning outcome exists, wherein the prize is equal to the determined payout.

3. A gaming system as claimed in claim 1, wherein each spinner of the plurality of non-concentric spinners has a respective set of associated symbols.

4. A gaming system as claimed in claim 3, wherein each set of symbols associated with a spinner is displayed on the spinner in a defined configuration.

5. A gaming system as claimed in claim 3, wherein each set of symbols associated with a spinner is selectable for display on the spinner.

6. A gaming system as claimed in claim 3, wherein the number of symbols in the set of symbols is equal to or greater than the number of display positions associated with the spinner.

7. A gaming system as claimed in claim 1, wherein at least one win line is defined for each two adjacently disposed spinners of the plurality of non-concentric spinners.

8. A gaming system as claimed in claim 7, wherein each win line of the at least one win line comprises three or four display positions.

9. A gaming system as claimed in claim 1, further comprising a plurality of win lines wherein at least one win line of the plurality of win lines is linear.

10. A gaming system as claimed in claim 1, further comprising a plurality of win lines wherein at least one win line of the plurality of win lines is non-linear.

11. A gaming system as claimed in claim 1, wherein the plurality of non-concentric spinners are circular.

12. A gaming system as claimed in claim 1, wherein at least one winning outcome is defined in relation to symbols appearing in one or more win lines.

13. A gaming system as claimed in claim 1, wherein the plurality of non-concentric spinners include three or four spinners.

14. A gaming system as claimed in claim 13, wherein the plurality of non-concentric spinners are disposed in a triangular or diamond shaped configuration.

15. A gaming system as claimed in claim 1, wherein the plurality of non-concentric spinners are virtual spinners represented on a display.

16. A gaming system as claimed in claim 1, wherein the gaming system is configured to operate in a special game mode or in a normal game mode, wherein the base game is implemented in the normal game mode.

17. A gaming system as claimed in claim 16, wherein the gaming system is further configured to commence the special game mode when a specific game outcome occurs.

18. A gaming system as claimed in claim 16, wherein the gaming system is further configured to commence the special game mode based on a game event occurring during a game, said game event including at least one of display of a particular symbol, player input, an amount or a type of bet placed, and a special game is purchased by the player.

19. A gaming system as claimed in claim 1, wherein the gaming system is implemented as a stand alone gaming machine or across a network.

20. A gaming system as claimed in claim 1, wherein one or more of the spinner controller and the outcome evaluator is implemented, at least in part, by a processor executing program code stored in a memory.

21. A method of gaming comprising:

receiving, at a processor, a wager for a player from a credit mechanism for play of a base game, wherein the credit mechanism includes at least one of a coin acceptor, a bill acceptor, a card reader, and a ticket reader;

providing a plurality of non-concentric spinners, each spinner of the plurality of non-concentric spinners comprising a plurality of display positions annularly disposed on the spinner, and having a plurality of symbols displayable at the plurality of display positions, wherein all display positions of the plurality of display positions are visible to a player;

conducting the base game, wherein a spinner game initiates upon an occurrence of a trigger condition in the base game;

selecting, using a processor, the symbols to appear at the display positions for each spinner during the spinner game;

determining, using the processor, whether the symbols displayed at the display positions correspond to at least one winning outcome by reference to at least one predefined combination of symbols, each predefined combination of symbols comprising a win line extending through respective centers of rotations of two adjacent spinners of the plurality of non-concentric spinners, said win line extending through a diameter of at least one spinner of said two adjacent spinners, the win line including two display positions from each of the two adjacent spinners; and determining, using the processor, a payout for the spinner game.

22. A method as claimed in claim 21, further comprising allocating a prize to a player when a winning outcome exists, wherein the prize is equal to the payout.

23. A method as claimed in claim 21, further comprising providing each spinner with a respective set of associated symbols.

24. A method as claimed in claim 23, comprising displaying each set of symbols associated with a spinner on the spinner in a defined configuration.

25. A method as claimed in claim 23, comprising facilitating selection of each set of symbols associated with a spinner of the plurality of non-concentric spinners for display on the spinner.

26. A method as claimed in claim 23, wherein the number of symbols in the set of symbols is equal to or greater than the number of display positions associated with the spinner.

27. A method as claimed in claim 21, comprising defining at least one win line for each two adjacently disposed spinners of the plurality of non-concentric spinners.

28. A method as claimed in claim 27, wherein each win line of the at least one win line comprises three or four display positions.

29. A method as claimed in claim 21, further comprising a plurality of win lines wherein at least one win line of the plurality of win lines is linear.

30. A method as claimed in claim 21, further comprising a plurality of win lines wherein at least one win line of the plurality of win lines is non-linear.

31. A method as claimed in claim 21, wherein the plurality of non-concentric spinners are circular.

32. A method as claimed in claim 21, further comprising defining at least one winning outcome in relation to symbols appearing in one or more win lines.

33. A method as claimed in claim 21, wherein the plurality of non-concentric spinners includes three or four spinners.

34. A method as claimed in claim 33, further comprising disposing the plurality of non-concentric spinners in a triangular or diamond shaped configuration.

35. A method as claimed in claim 21, wherein the plurality of non-concentric spinners are virtual spinners represented on a display.

36. A non-transitory computer readable storage medium having computer readable program code embodied therein for causing a computer to operate in accordance with a gaming system comprising:

a credit mechanism configured to receive a wager from a player for play of a base game, wherein the credit mechanism includes at least one of a coin acceptor, a bill acceptor, a card reader, and a ticket reader;

a plurality of non-concentric spinners, each spinner of the plurality of non-concentric spinners comprising a plurality of display positions annularly disposed on the spinner, and having a plurality of symbols displayable at the plurality of display positions, wherein all display positions of the plurality of display positions are visible to a player; and a game controller comprising:

a base game controller configured to conduct the base game, wherein a spinner game initiates upon an occurrence of a trigger condition in the base game;

a spinner controller configured to select the symbols to appear at the display positions for each spinner during the spinner game; and an outcome evaluator configured to:

determine whether the symbols shown at the display positions correspond to at least one winning outcome by reference to at least one predefined combination of symbols, each predefined combination of symbols comprising a win line extending through respective centers of rotations of two adjacent spinners of the plurality of non-concentric spinners, said win line extending through a diameter of at least one spinner of said two adjacent spinners, the win line including two display positions from each of the two adjacent spinners; and determine a payout for the spinner game.

* * * * *